US012345082B2

(12) United States Patent
Lee

(10) Patent No.: US 12,345,082 B2
(45) Date of Patent: Jul. 1, 2025

(54) UNIVERSAL ROLLER BRACKET FOR A MOVABLE BARRIER

(71) Applicant: OVERHEAD DOOR CORPORATION, Lewisville, TX (US)

(72) Inventor: Bradley J. Lee, Arlington, TX (US)

(73) Assignee: Overhead Door Corporation, Lewisville, TX (US)

( * ) Notice: Subject to any disclaimer, the term of this patent is extended or adjusted under 35 U.S.C. 154(b) by 332 days.

(21) Appl. No.: 17/889,162

(22) Filed: Aug. 16, 2022

(65) Prior Publication Data

US 2024/0060342 A1 Feb. 22, 2024

(51) Int. Cl.
*E05D 15/24* (2006.01)
*E05D 15/16* (2006.01)

(52) U.S. Cl.
CPC ........... *E05D 15/24* (2013.01); *E05D 15/165* (2013.01); *E05Y 2900/106* (2013.01)

(58) Field of Classification Search
CPC ........... E05Y 2201/64; E05Y 2900/106; E05D 2015/1026; E05D 15/165; E05D 15/24
See application file for complete search history.

(56) References Cited

U.S. PATENT DOCUMENTS 2,525,309 A * 10/1950 Norberg ................ E05D 15/242 16/104
2,624,065 A * 1/1953 Moler ................... E05D 15/242 16/104
2,655,683 A * 10/1953 McKee ................. E05D 15/242 16/104
2,703,141 A * 3/1955 McKee ................. E05D 15/165 16/104
2,827,115 A * 3/1958 Stroup .................... E05D 15/24 16/97
2,877,843 A * 3/1959 Stroup .................. E05D 15/165 16/98
3,176,757 A * 4/1965 Lomaz .................... E05D 15/24 160/40
3,376,913 A * 4/1968 Clapsaddle ........... E05D 15/242 16/97
3,447,192 A * 6/1969 Pemberton ............ E05D 15/242 16/104
3,457,983 A * 7/1969 Pemberton ............ E05D 15/165 16/265
5,235,724 A 8/1993 Perrin
(Continued)

OTHER PUBLICATIONS

Airlift Doors, Inc., Alaska Polycarbonate Door Product Catalog, dated before Aug. 16, 2022, pp. 1-3, 19, 64.
(Continued)

*Primary Examiner* — Johnnie A. Shablack
(74) *Attorney, Agent, or Firm* — Haynes and Boone, LLP

(57) ABSTRACT

A universal roller bracket for a movable barrier having a surface, the universal roller bracket comprising: a first bracket section configured to be coupled to the movable barrier; a first arm extending from the first bracket section; and a plurality of roller tubes supported by the first arm and spaced from the surface of the movable barrier by the first arm, each roller tube of the plurality of roller tubes configured to receive a roller stem, each roller tube being spaced a different distance from the surface of the movable barrier.

20 Claims, 4 Drawing Sheets

(56) References Cited

U.S. PATENT DOCUMENTS

| | | | | |
|---|---|---|---|---|
| 6,098,697 | A * | 8/2000 | Krupke | E05D 15/242 160/229.1 |
| 6,112,799 | A * | 9/2000 | Mullet | E05D 15/24 160/236 |
| 6,185,783 | B1 | 2/2001 | Carpinella | |
| 6,363,993 | B1 * | 4/2002 | Aquilina | E05D 15/24 160/229.1 |
| 6,679,310 | B2 * | 1/2004 | De Zen | E05D 15/242 160/229.1 |
| 6,843,300 | B2 * | 1/2005 | Mullet | E05D 15/242 160/229.1 |
| 7,201,207 | B2 * | 4/2007 | Colston | E05D 15/242 160/229.1 |
| 7,454,815 | B2 * | 11/2008 | Brinkmann | E05D 15/24 16/271 |
| 8,091,607 | B2 * | 1/2012 | Aquilina | E05D 15/24 160/201 |
| 9,115,523 | B2 | 8/2015 | Friesen | |
| 9,212,511 | B2 | 12/2015 | Mortier | |
| 9,296,280 | B2 | 3/2016 | Ehrlich | |
| 2005/0251958 | A1 | 11/2005 | Coblentz | |
| 2005/0273976 | A1 | 12/2005 | Sarver | |
| 2006/0080806 | A1 | 4/2006 | Johnson | |
| 2023/0003065 | A1 * | 1/2023 | Roesner | E06B 3/485 |
| 2024/0175305 | A1 * | 5/2024 | Lee | E05D 15/244 |
| 2024/0183206 | A1 * | 6/2024 | Kornish | E05D 13/00 |

OTHER PUBLICATIONS

Finishline Garage Doors, photographs of garage door taken before Aug. 16, 2022, 1 page.

* cited by examiner

UNIVERSAL ROLLER BRACKET FOR A MOVABLE BARRIER

TECHNICAL FIELD

The present disclosure relates generally to the field of movable barriers. In particular, a universal roller bracket spaces rollers from a movable barrier at differing distances.

BACKGROUND

Movable barriers, such as upward-acting sectional or single panel garage doors, residential and commercial rollup doors, and slidable and swingable gates, are used to alternatively allow and restrict entry to building structures and property. An upward-acting slidable barrier typically includes rollers positioned on either side of the barrier which roll along a track. Each roller is secured to the barrier with a roller bracket. In a closed position, the barrier is positioned vertically and the track is angled from the barrier extending upward. In this way, the distance between the barrier and the track increases with vertical height. The angle of the track with respect to the barrier ensures that the barrier is pulled away from the jamb of the barrier as the barrier is slid upward during opening.

The roller brackets of the barrier are typically selected to maintain the angle between the track and the barrier in a closed position. As a result, each bracket is individually sized to space the roller from the movable barrier by a fixed, set distance. For example, one bracket at the bottom of the barrier may space a roller from the barrier by a minimal amount, while other brackets above the bottom bracket may space rollers from the barrier by other fixed amounts. The movable barrier typically includes several differently sized roller brackets to achieve this result. Specifically, each roller bracket of the barrier has a roller stem tube mounting location unique to the roller brackets at any other section of the barrier. In the case of a four-section barrier, up to five unique roller brackets may be required, with at least one at each section joint and a bracket at the top and bottom of the barrier to provide the necessary graduated track angle. Multiple unique brackets typically requires that servicers have several different bracket types, increasing inventory tracking complexity as well as complexity and costs of servicing barriers or maintaining on-hand inventory.

SUMMARY

In some example aspects, the present disclosure is directed to a universal roller bracket for a movable barrier. The universal roller bracket includes a surface and a first bracket section configured to be coupled to the movable barrier; a first arm extending from the first bracket section; and a plurality of roller tubes supported by the first arm and spaced from the surface of the movable barrier by the first arm, each roller tube of the plurality of roller tubes configured to receive a roller stem, each roller tube being spaced a different distance from the surface of the movable barrier.

In some aspects, the first bracket section is configured to be slidably coupled to the surface of the movable barrier. In some aspects, the first bracket section includes a protrusion configured to be positioned within a complementary groove of the surface of the movable barrier. In some aspects, the universal roller bracket includes a second bracket section spaced from the first bracket section, the second bracket section configured to be fixedly coupled to the surface of the movable barrier with a fastener. In some aspects, the distance of the roller stem from the surface of the movable barrier is based on an installation height of the roller stem when the movable barrier is in a closed position. In some aspects, the different distances of each roller tube correspond to a linear or non-linear relationship. In some aspects, the universal roller bracket includes a second arm, the first arm and the second arm forming a gap between the plurality of roller tubes and the surface of the movable barrier. In some aspects, the first bracket section includes a protrusion configured to be inserted into a complementary groove of the surface of the movable barrier.

In some example aspects, the present disclosure is directed to a movable barrier system. The movable barrier system includes a first section of a movable barrier comprising an inner surface and an outer surface, the inner surface comprising a retaining groove; a first universal roller bracket comprising: a first bracket section comprising a protrusion configured to be positioned within the retaining groove of the first section; and a first plurality of roller tubes spaced from the inner surface, wherein each roller tube is positioned a different distance from the inner surface; and a roller comprising a roller stem, wherein the roller stem is configured to be positioned within one of the plurality of roller tubes.

In some aspects, the movable barrier is configured to be substantially vertical when in a closed position when the roller stem is positioned within the one roller tube of the plurality of roller tubes. In some aspects, the first universal roller bracket includes a second bracket section configured to be fixedly coupled to the first section. In some aspects, the movable barrier system includes a second section of the movable barrier comprising an inner surface and an outer surface; and a second universal roller bracket including a second plurality of roller tubes, the second universal roller bracket configured to be coupled to the second section, wherein each roller tube of the second plurality of roller tubes is positioned a different distance from the inner surface of the second section, and wherein the distance of each roller tube of the second plurality of roller tubes from the inner surface of the second section is different than the distance of each roller tube of the first plurality of roller tubes of the first universal roller bracket from the inner surface of the first section. In some aspects, the second section is positioned above the first section and the second universal roller bracket is positioned above the first universal roller bracket when the movable barrier is in a closed position.

In some example aspects, the present disclosure is directed to a method of assembling a movable barrier system. The method includes positioning a roller within a track of the movable barrier system; slidably coupling a first surface of a universal roller bracket to a section of a movable barrier, the universal roller bracket comprising a plurality of roller tubes spaced from the section of the movable barrier, wherein each roller tube of the plurality of roller tubes is spaced from the section by a different distance; sliding the universal roller bracket to a position near an end of the section of the movable barrier; inserting a roller stem of the roller within one roller tube of the plurality of roller tubes; and fixedly coupling a second surface of the universal roller bracket to the section of the movable barrier.

In some aspects, the method includes fixedly coupling the first surface of the universal roller bracket to the section of the movable barrier. In some aspects, slidably coupling the first surface of the universal roller bracket to the section of the movable barrier includes positioning a protrusion of the universal roller bracket within a corresponding groove of the section of the movable barrier. In some aspects, coupling the second surface of the universal roller bracket to the section of the movable barrier includes coupling the second surface of the universal roller bracket to the section of the movable barrier with a fastener. In some aspects, the one roller tube of the plurality of roller tubes into which the roller stem is inserted is selected based on an installation height of the universal roller bracket on the section of the movable barrier. In some aspects, the installation height of the universal roller bracket is determined when the movable barrier is in a closed position.

It is to be understood that both the foregoing general description and the following drawings and detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following. One or more features of any implementation or aspect may be combinable with one or more features of other implementation or aspect.

BRIEF DESCRIPTION OF THE DRAWINGS

The accompanying drawings illustrate implementations of the systems, devices, and methods disclosed herein and together with the description, serve to explain the principles of the present disclosure.

Figure 1:
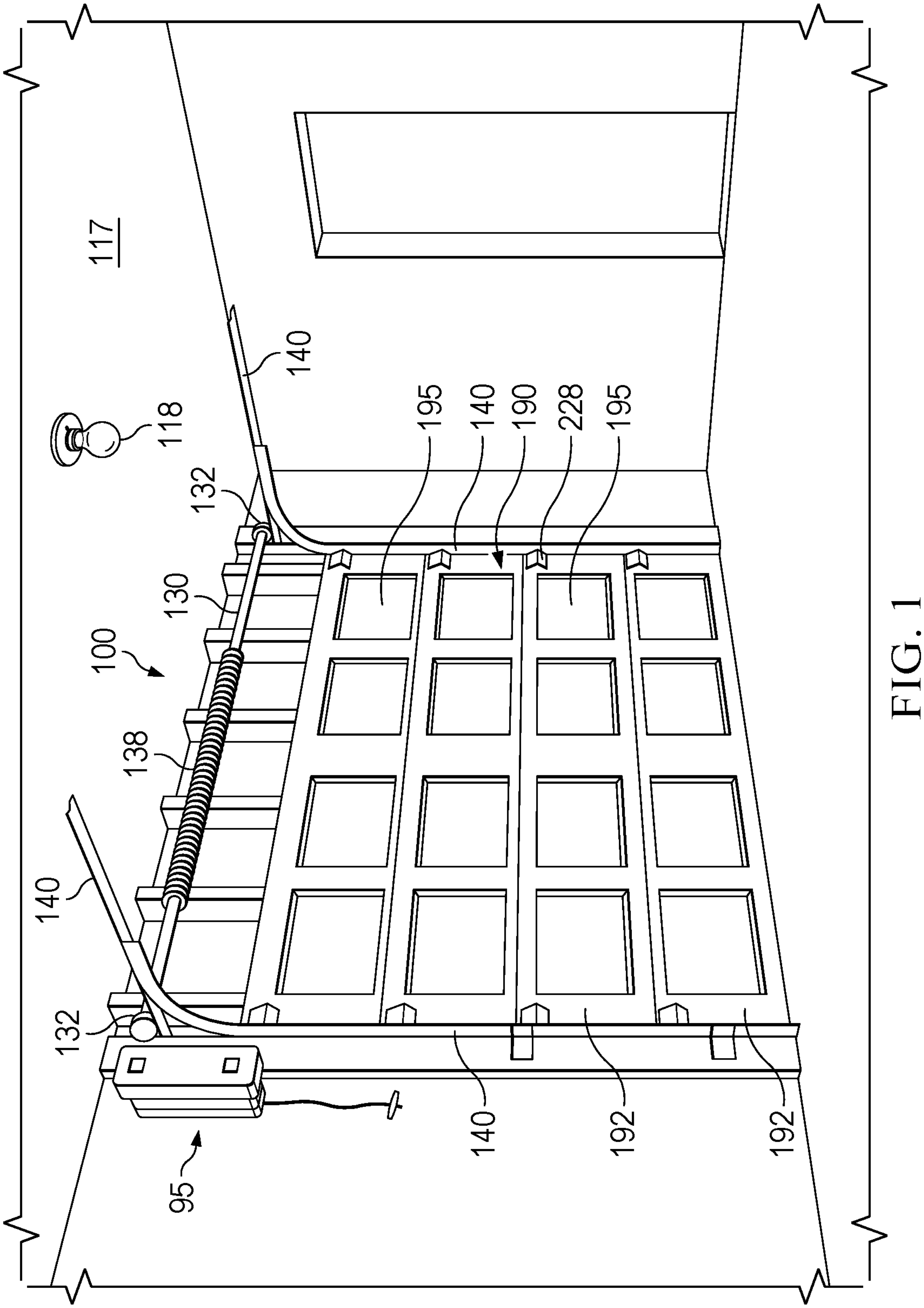
FIG. 1 is a perspective illustration of a movable barrier system, according to aspects of the present disclosure.

These Figures will be better understood by reference to the following Detailed Description.

DETAILED DESCRIPTION

For the purpose of promoting an understanding of the principles of the present disclosure, reference will now be made to the implementations illustrated in the drawings and specific language will be used to describe them. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In addition, this disclosure describes some elements or features in detail with respect to one or more implementations or Figures, when those same elements or features appear in subsequent Figures, without such a high level of detail. It is fully contemplated that the features, components, and/or steps described with respect to one or more implementations or Figures may be combined with the features, components, and/or steps described with respect to other implementations or Figures of the present disclosure. For simplicity, in some instances the same or similar reference numbers are used throughout the drawings to refer to the same or like parts.

In some aspects, the present disclosure relates to a universal roller bracket used to hold rollers of an upward-acting movable barrier. The universal roller bracket includes multiple roller tubes which may receive a stem of a roller. Each roller tube is arranged to be a different distance from a plane formed by the movable barrier. Accordingly, a user can choose which roller tube to use for a particular roller based on the location of the universal roller bracket on the door. In use, the universal roller bracket may secure the movable barrier to two tracks on either side of the movable barrier. If the tracks are angled with respect to a plane defined by the movable barrier in a closed position, the universal roller may account for the angle between the tracks and the movable barrier. It may account for this angle because each roller tube of the universal roller bracket may space a roller at a different distance away from the plane defining the movable barrier and/or from the movable barrier itself. Thus, the same universal roller bracket may be used at varying sections of the movable barrier to space rollers at gradually increasing distances from the movable barrier as height along the movable barrier increases. For example, at a lower section of the movable barrier, a roller securing the movable barrier to the track may be placed within a roller tube positioned closest to the movable barrier. At a location above this lower section, a roller may be placed within a roller tube spaced by a greater distance from the movable barrier. At another higher location, a roller may be placed in a roller tube spaced by a still greater distance from the movable barrier, and so on.

FIG. 1 is a perspective illustration of an example movable barrier system 100, according to aspects of the present disclosure. In this example, the movable barrier is an upward acting garage door. In some examples, the movable barrier may be a sectional-type garage door. FIG. 1 illustrates a movable barrier 190 and a barrier operator 95. In some implementations, the movable barrier 190 may include multiple sections 192, multiple panels 195, and multiple universal roller brackets 228. In some implementations, the sections 192 make up the movable barrier 190. For example, in FIG. 1, the movable barrier 190 may include four sections 192 arranged vertically. The panels 195 may be positioned within the sections 192 and may be transparent or non-transparent.

In some implementations, the movable barrier system 100 described herein may be referred to as a barrier system, a door system, a garage door system, a gate system, or any other similar term. In some implementations, the movable barrier 190 may be referred to as a barrier, a door, a garage door, a sectional garage door, an upward acting garage door, a gate, a movable gate, a sliding gate, or any other similar term. In some implementations, the barrier operator 95 may alternatively be referred to as an operator, a door operator, a garage door operator, a gate operator, an opener, a door opener, a garage door opener, a gate opener, a control system, or any other similar term. In some implementations, the light fixture 118 may be referred to as a light, a light system, or any other similar term.

FIG. 1 shows that the movable barrier 190 provides access to a space or a room having a ceiling 117 and the light fixture 118 that is spaced from the barrier operator 95. The movable barrier 190 may provide selective access to the space. The barrier operator 95 may be any suitable type of barrier operator. For example, in some implementations, the barrier operator 95 may be a jackshaft operator. In other implementations, the barrier operator 95 may be a direct drive wall or ceiling mounted operator, a belt driven operator, a chain driven operator, a screw drive operator, a trolley operator, a carriage operator, or any other type of barrier operator. The barrier operator 95 may include any suitable components. As shown in FIG. 1, the barrier operator 95 may be disposed adjacent the movable barrier 190. For example, in the implementation shown, the barrier operator 95 may be positioned on the same wall as the opening covered by the movable barrier 190. However, the barrier operator 95 may be positioned at any other location within the room shown in FIG. 1. For example, the barrier operator 95 may be affixed to the ceiling 117. In some implementations, the barrier operator 95 may be positioned on a different wall of the room or on the floor of the room. In some implementations, particularly in an implementation in which the barrier operator 95 is affixed or otherwise positioned on the ceiling 117 of the room, the light fixture 118 may be attached to, or a part of, the barrier operator 95.

Any suitable structures or components may be implemented to facilitate movement of the movable barrier 190 between a closed position and an open position. In the example shown in FIG. 1, the movable barrier 190 may be moved along one or more tracks 140. Additionally shown in FIG. 1 is a shaft 130, cable drums 132, and a torsion spring 138.

FIG. 1 illustrates the movable barrier 190 as an upward acting sectional door being movable between open and closed positions along the tracks 140. The tracks 140 may be affixed to either side of the opening of the movable barrier 190. In some implementations, the tracks 140 may be affixed to the wall of the room shown in FIG. 1 and/or the ceiling 117. In some implementations, the movable barrier 190 may include one or more rolling or sliding components on either side sized and shaped to fit within and move in a longitudinal direction along the tracks 140. The rolling or sliding components may be affixed to the brackets positioned on either side of the movable barrier 190, such as the universal roller brackets 228 shown, and as will be described in more detail hereafter.

Components of the barrier system 100 shown in FIG. 1 may include any other suitable components. For example, the barrier system 100 may include rollers positioned on the movable barrier 190 or the tracks 140. The system 100 may include sensors, such as safety sensors configured to detect the presence or motion of an object or person, seals positioned along any portion of the movable barrier 190 or the corresponding opening, tracks, cables, or tube shafts. The system may include extension springs to further reduce necessary rotational force of a motor, a motor rail, belts, motor head, motor arms, lift handles for manual operation, emergency release ropes, or any other suitable components.

Figure 2:
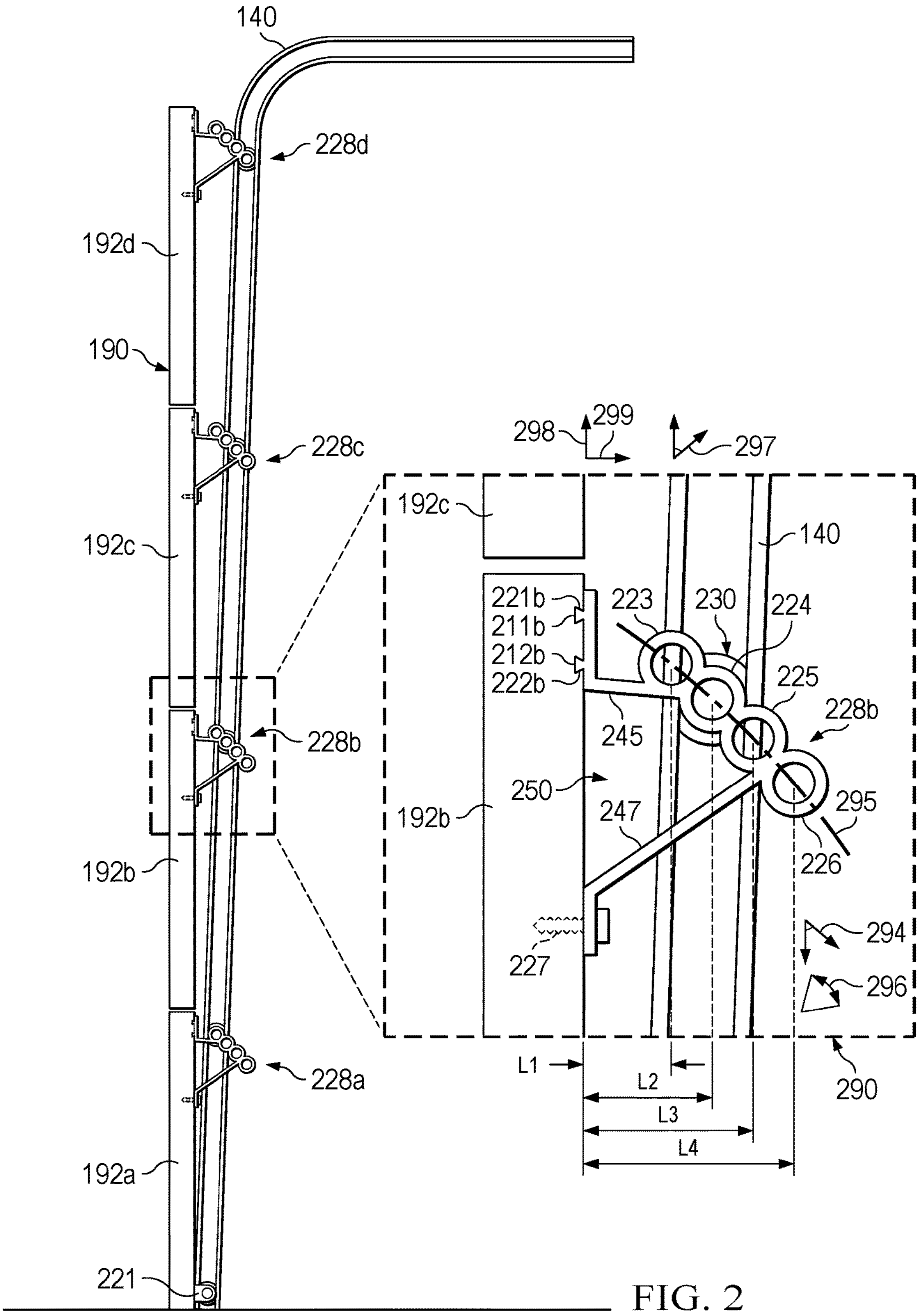
FIG. 2 is a side view of a movable barrier in a closed position along a track with universal roller brackets, according to aspects of the present disclosure.

It is noted that the movable barrier 190 may include any number of sections (e.g., sections 192*a-d*), including a number of sections greater or less than those shown. Additionally, any of the sections 192*a-d* may include any number of roller brackets of various types. As shown in FIG. 2, the movable barrier 190 may be a four-section barrier, such as the movable barrier 190 on a straight vertical track.

FIG. 2 is a side view of the movable barrier 190 in a closed position along the track 140 with universal roller brackets 228, according to aspects of the present disclosure. As shown in FIG. 2, while in a closed position, the movable barrier 190 may be positioned vertically. For example, FIG. 2 depicts two axes: a vertical axis 298 and a horizontal axis 299. The movable barrier 190 may be positioned substantially parallel to the vertical axis 298. Multiple universal roller brackets 228 may be positioned in relation to the movable barrier 190 securing the movable barrier 190 to the track 140 shown. As will be described in more detail below, the universal roller brackets 228 provide multiple roller tubes which each may receive a roller 230. The roller tubes may be positioned at different offset lengths from the inner surface of the movable barrier 190. Due to the multiple roller tubes placed at differing positions, the same universal roller bracket 228 may be used at multiple locations along the inner surface of the movable barrier 190 or may be affixed to different sections 192 of the movable barrier 190 and provide an angle 297 of the track 140.

As shown in FIG. 2, the track 140 of the movable barrier system may be positioned at an angle 297 from the vertical axis. In some implementations, this angled track 140 is oriented at varying distances from the jamb of the movable barrier 190. Such an orientation of the track 140 ensures that the movable barrier 190 quickly pulls away from the jamb when the movable barrier 190 translates upward. It is noted that the angle 297 depicted in FIG. 2 may not be geometrically accurate, as shown. Rather, the depiction of the angle 297 may be exaggerated for pedagogical purposes (e.g., to show an increased offset distance between the movable barrier 190 and the track 140 with height).

It is noted that the movable barrier 190 may include any number of sections 192, including a number of sections greater or less than those shown in FIG. 1 or FIG. 2. Additionally, any of the sections 192 may include any number of roller brackets of various types. As shown in FIG. 2, a four-section barrier, such as the movable barrier 190 may include five roller brackets including a lower roller bracket 221 at the bottom of the door and multiple universal roller brackets 228. These roller brackets may be symmetrical and can be mounted on the left or right ends of the movable barrier.

In the implementation shown, the section 192*a* of the movable barrier 190 is secured to the track 140 via a universal roller bracket 228*a*. The sections 192*b*-192*d* are similarly secured to the track 140 via respective universal roller brackets 228*b-d*. As shown, the lower roller bracket 221 may affix a lower portion of the section 192*a* to the track 140 as described previously.

FIG. 2 provides an enlarged view 290 of the universal roller bracket 228*b*. As shown in the view 290, the roller bracket 228 may include an upper bracket section including a protrusion 221*b* and a protrusion 222*b*. The protrusions 221*b* and 222*b* may be sized and shaped to be received within corresponding grooves 211*b* and 212*b* within an inner surface of the section 192*b* shown. In this way, prior to installation and/or during installation of the universal roller bracket 228*b*, the bracket 228*b* may be moved along the grooves 211*b* and 212*b* in a direction horizontal to the movable barrier 190 (e.g., perpendicular to the horizontal axis 299 and the vertical axis 298).

An upper arm 245 extends from the upper bracket section (see e.g., the upper section 346 of FIG. 3 and/or the upper section 446 of FIG. 4) away from the inner surface of the section 192*b* and supports a plurality of roller tubes. The roller tubes shown include a roller tube 223, a roller tube 224, a roller tube 225, and a roller tube 226. As shown, each of the roller tubes 223-226 may be spaced from the inner surface of the section 192*b* or from the leg of the roller bracket 228 by a different offset length (e.g., lengths L1, L2, L3, and L4). For example, the roller tube 223 may be spaced from the inner surface of the movable barrier 192 and/or the upper bracket section of the roller bracket 228*b* by an offset length L1. The roller tube 224 may be spaced from the inner surface of the movable barrier 192 and/or the upper bracket section of the roller bracket 228*b* by an offset length L2. The roller tube 225 may be spaced from the inner surface of the movable barrier 192 and/or the upper bracket section of the roller bracket 228*b* by an offset length L3. The roller tube 226 may be spaced from the inner surface of the movable barrier 192 and/or the upper bracket section of the roller bracket 228*b* by an offset length L4. In some implementations, the offset lengths L1-L4 between the roller tubes 223-226 and the section 192*b* may provide the desired angle 297 between the movable barrier 190 and the track 140.

Specifically, the roller tube 223 may be positioned at an offset length L1 such that, with the roller bracket 228*a* affixed to the lowest section 192*a* of the movable barrier 192, a corresponding roller 230 is positioned within the roller tube 223. Such an arrangement is illustrated by the universal roller bracket 228*a* shown in FIG. 2.

Similarly, the roller tube 224 may be positioned at an offset length L2 such that, with the roller bracket 228*b* affixed to the section 192*b* of the movable barrier 192, the roller 230 shown in the enlarged view 390 is positioned within the roller tube 224. Such an arrangement is also illustrated by the universal roller bracket 228*b* shown in FIG. 2.

The roller tube 225 may be positioned at an offset length L3 such that, with the roller bracket 228*c* affixed to the section 192*c* of the movable barrier 192, a corresponding roller 230 is positioned within the roller tube 225. Such an arrangement is also illustrated by the bracket assembly 192*c* shown in FIG. 2.

The roller tube 226 may be positioned at an offset length L4 such that, with the roller bracket 228*d* affixed to the section 192*d* of the movable barrier 192, a corresponding roller 230 is positioned within the roller tube 226. Such an arrangement is also illustrated by the bracket assembly 228*d* shown in FIG. 2.

It is noted that in some cases, the universal roller bracket 228*d* shown and described with reference to FIG. 2 may alternatively be an upper roller bracket. For example, similar to the lower roller bracket 221, an upper roller bracket may include a single roller tube spaced at a predetermined offset length (e.g., length L4) from the upper region of the section 192*d*. In such a case, the universal roller brackets 228 may alternatively include only three roller tubes (e.g., roller tubes 223, 224, and 225). Additional aspects of such a universal roller bracket are described in more detail with reference to FIG. 3 below.

Figure 3:
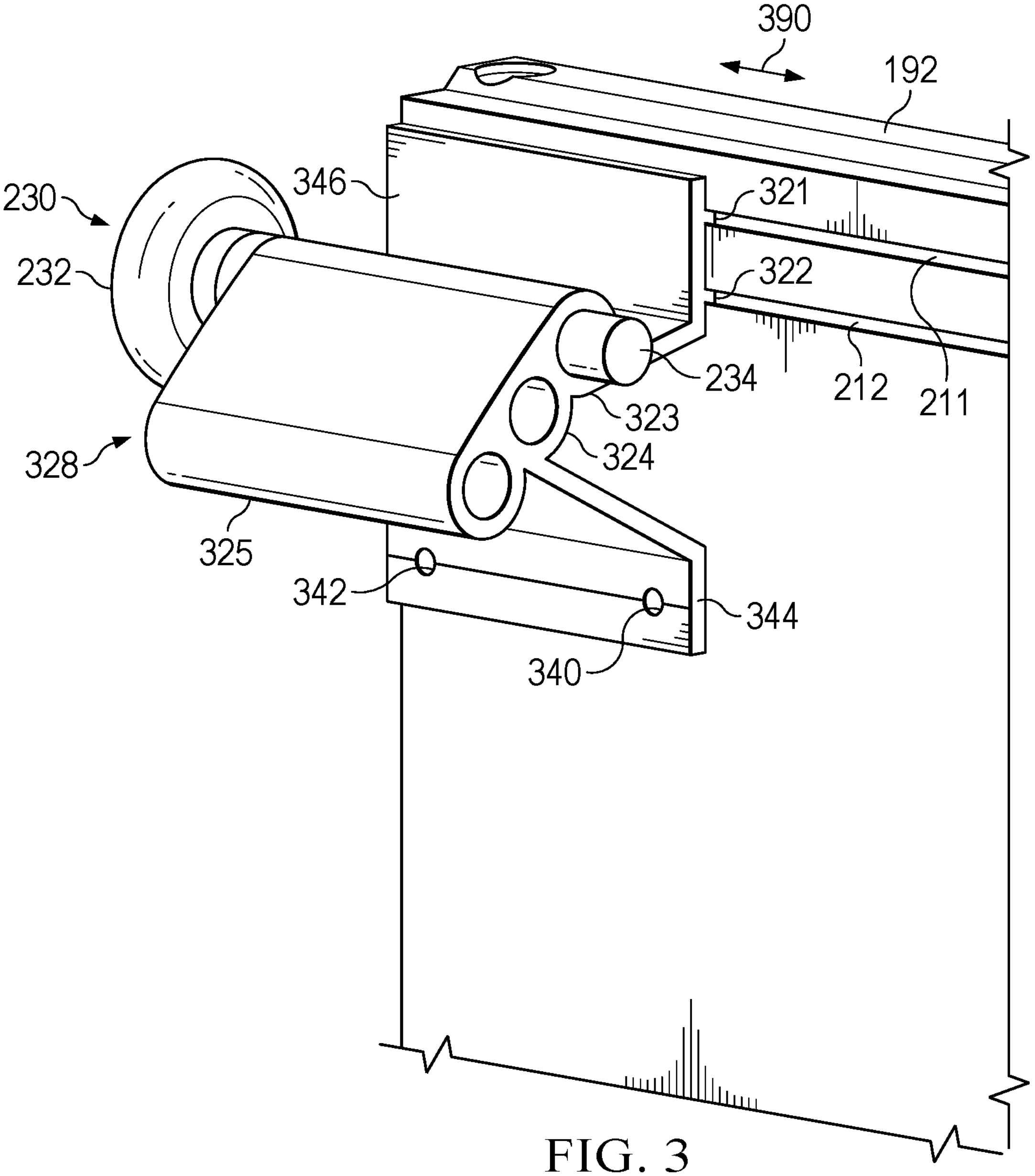
FIG. 3 is a perspective view of a section of a movable barrier, a universal roller holder, and a roller, according to aspects of the present disclosure.
Figure 4:
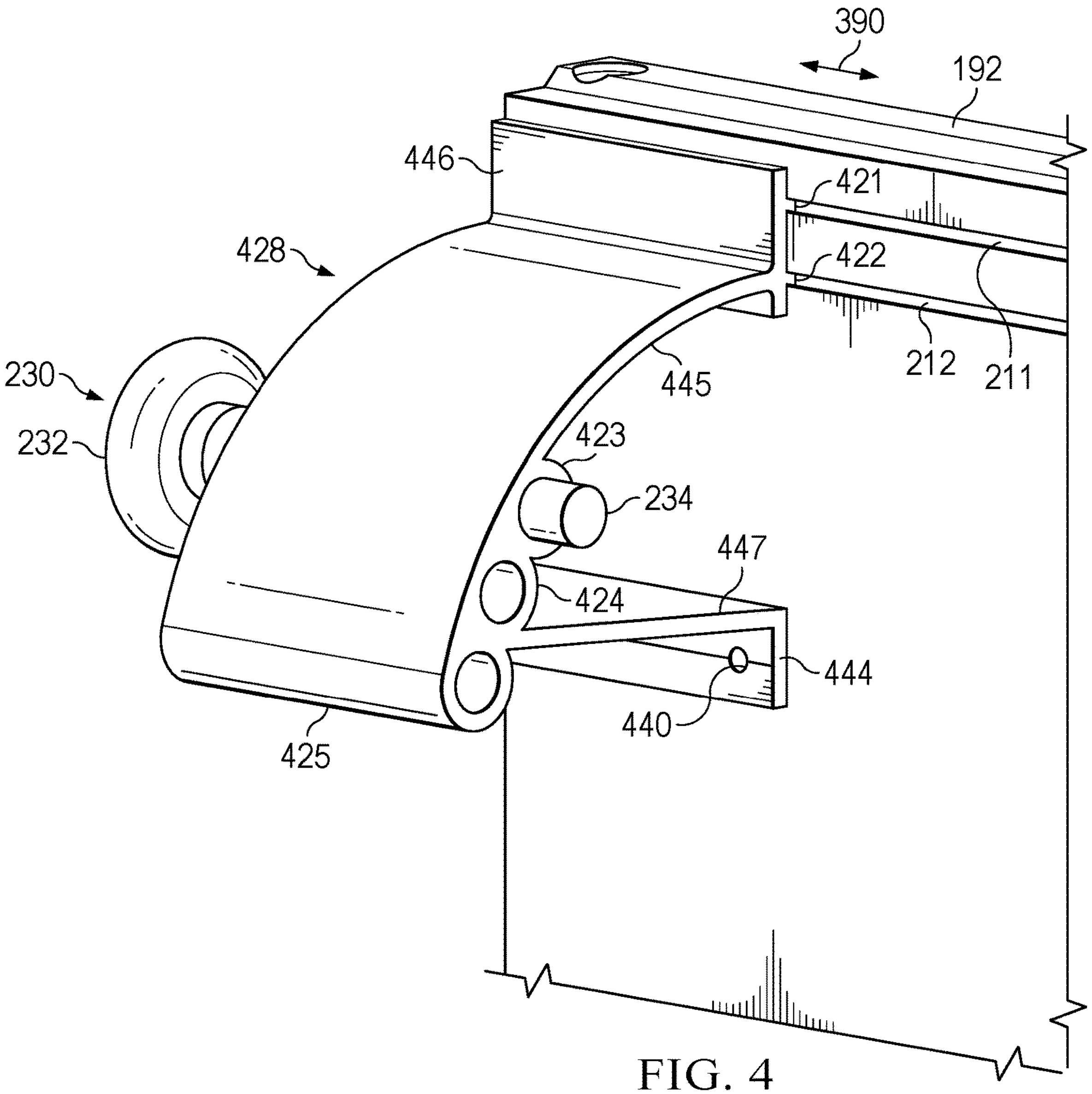
FIG. 4 is a perspective view of a section of a movable barrier, a universal roller holder, and a roller, according to aspects of the present disclosure.

The roller bracket 228*b* additionally includes a lower arm 247 and a lower bracket section (see e.g., the lower section 344 of FIG. 3 and/or the upper section 444 of FIG. 4). Similar to the upper arm 245, the lower arm 247 may support the roller tubes 223-226. For example, the lower arm 237 may extend from the lower bracket section affixed to the section 192*b* at an angle and is fixedly coupled to any one or more of the roller tubes 223-226. In some implementations, the lower bracket section may include one or more openings through which a fastener, such as the fastener 227 shown, may be positioned. In some implementations, the fastener 227 may be a self-tapping fastener which creates and engages with a recess in the inner surface of the section 192*b*. In other implementations, recesses may be formed within the section 192*b* which may be sized and shaped to receive a corresponding fastener, such as the fastener 227. It is anticipated that any suitable type of fastener may secure the lower bracket section to the inner surface of the section 192*b*, including, for example, grooves preformed into the movable barrier section 192*b* and corresponding protrusions of the universal bracket 228*b*, similar to those described with reference to the upper bracket section.

As described above, the upper bracket section of the roller bracket 228 may be slidably coupled to the inner surface of the section 192*b* while the lower bracket section may be fixedly coupled to the inner surface of the section 192*b* by a fastener 227. In some implementations, the upper portion may be slidably connected by the protrusions 221*b* and 222*b* and corresponding grooves 211*b* and 212*b* during installation at some time before the lower bracket section is fixedly secured to the section 192*b* by the fastener 227.

Because of the varying offset lengths between the roller tubes 223-226 of the roller bracket 228, the same bracket 228 may be used to secure any of the sections 192*a*-*d* of the movable barrier 192 by using different roller tubes for different sections as shown. This versality of the roller bracket 228 reduces the number of unique parts required for manufacturing or installation of the barrier system shown and described with reference to FIG. 2. For example, the disclosed universal roller bracket 228 may reduce the number of unique roller brackets for a movable barrier from five (e.g., the lower roller bracket 221, as well as four different sized roller brackets) to two (e.g., the lower roller bracket 221 and universal roller brackets 228) or, in some cases three (e.g., the lower roller bracket 221, universal roller bracket 228, and an upper roller bracket) as described previously. In addition, by reducing the number of required unique components for a movable barrier, the universal roller bracket 228 reduces the number of unique parts required to be transported to an installation or servicing procedure. The reduction in unique components also reduces installation and service complexity. In addition, the universal roller bracket 228 may be symmetrical for use on the left and right ends of the section panels. The reduced number of unique parts reduces cost and complexity of manufacturing, increasing affordability and availability of the part. The design of the universal roller bracket 228 additionally reduces required manufacturing labor. In some implementations, the universal roller bracket 228 may be constructed of aluminum and may be extruded and cut to the desired length. In other implementations, the universal roller bracket 228 may be constructed of any other suitable material, such as steel. The part is made from an aluminum extrusion cut to desired length. As shown, the universal roller bracket 228 advantageously reduces manufacturing costs, including retooling costs, as well as inventory management and logistical cost and complexity.

As shown in the enlarged view 290 of FIG. 2, the position of the roller tubes 223-226 may be oriented along a line 295 extending away from the section 192*b*. For example, the line 295 may extend from an upper region of the inner surface of the section 192*b* of the movable barrier 192 downward and away from the movable barrier 192. In some implementations, the line 295 may extend away from the movable barrier 192 at an angle 294. In some implementations, the line 295 may be a straight line. In some implementations, such as the one shown in FIG. 2, the line 295 may be curved. For example, the roller tubes 223-226 may be positioned along the line 295 according to a curve of a curvature 296. This curvature may arc back toward the inner surface of the section 192*b*.

As mentioned previously, the positions of the roller tubes 223-226 may be arranged along a straight line or a curved line extending from the inner surface of the movable barrier 192. Specifically, in an implementation in which the roller tubes 223-226 are arranged along a straight line, the locations of the roller tubes 223-226 may be described as having a linear relationship. For example, a linear relationship may relate to an increase in separation distance of the roller tubes being constant. As shown in FIG. 2, the difference between the offset length L1 corresponding to the roller tube 223 and the offset length L2 corresponding to the roller tube 224 may be the same as the difference in length between L2 and L3 as well as L3 and L4.

For a linear or non-linear relationship between the roller tubes 223-226, the difference between the lengths L1-L4 may not be constant. For example, the difference in length between lengths L2 and L3 may be less than the difference in length between lengths L1 and L2. Similarly, the difference in length between lengths L3 and L4 may be less than the difference in length between lengths L2 and L3. In some implementations, a linear or non-linear relationship of the roller tubes 223-226 may account for vertical variation of the roller tubes 223-226 thus more precisely maintaining the angle 297 at all locations along the movable barrier 192

In some implementations, a hinge or joint may join the sections of the movable barrier 192. For example, a hinge or joint may be positioned between the sections 192*b* and 192*c* and above the universal roller bracket 228*b*. In some implementations, the orientation of the roller tubes 223-226 may provide a range of motion for the hinge or joint joining the sections 192*b* and 192*c* as the movable barrier 192 moves through curved sections of the track 140.

The upper arm 245, the lower arm 247, and the roller tubes 223-226 may together form a gap 250 between the inner surface of the section 192*b* and a middle portion of the roller bracket 228*b* between the upper and lower bracket sections. This gap 250 may advantageously reduce the amount of required material to construct the universal roller bracket 228*b*. In addition, this gap 250 may provide additional flexibility to the universal roller bracket 228*b*. Such increased flexibility may reduce the risk of breakage of the universal roller bracket 228*b* as well as provide for smoother movement and/or operation of the movable barrier. It is also noted that a method of assembly of the universal roller bracket 228*b* to the movable barrier 192 and a roller 230 may be substantially similar to the method of assembly of the universal roller bracket 328 described herein.

FIG. 3 is a perspective view of a section 192 of the movable barrier 192, a universal roller bracket 328, and a roller 230, according to aspects of the present disclosure. As shown in FIG. 3, the section 192 of the movable barrier 190 includes two grooves 211 and 212, like the grooves 211*b* and 212*b* described previously. The grooves 211 and 212 may extend in a horizontal direction along the section 192 of the movable barrier 190.

The universal roller bracket 328 may be similar to the universal roller bracket 228 described with reference to FIG. 2. For example, the universal roller bracket 328 may include an upper bracket section 346. The upper bracket section 346 may include two protrusions: a protrusion 321 and a protrusion 322. The protrusions 321 and 322 may be positioned within the corresponding grooves 211 and 212 of the section 192 of the movable barrier 190. In this way, the universal roller bracket 328, with the protrusions 321 and 322 within the grooves 211 and 212 may be permitted to move in a horizontal direction 390 along the section 192 of the movable barrier 190 but may be constrained from moving in any other direction.

The universal roller bracket 328 may include three roller tubes including a roller tube 323, a roller tube 324, and a roller tube 325. Similar to the roller tubes 223-226 described with reference to FIG. 2, each of the roller tubes 323-325 may be sized and shaped to receive a roller 230. For example, the roller 230 shown may include a circular portion 232 of a larger diameter, and a roller stem 234. The roller stem 234 may be of cylindrical shape with a smaller diameter than the portion 232. The roller stem 234 may be inserted within any of the roller tubes 323-325 and/or any of those previously or hereafter described.

The universal roller bracket 328 may additionally include a lower bracket section 344. The lower bracket section 344 may include two openings 340 and 342. In some implementations, the openings 340 and 342 may receive fasteners used to secure the lower bracket section 344 to the section 192 of the movable barrier 190. In some implementations, the recesses 340 and 342 may align with corresponding orifices within the section 192 of the movable barrier 192 also sized and shaped to receive fasteners.

During an assembly of the universal roller bracket 328 (as well as any other brackets described herein) with the movable barrier 190 and the roller 230, the circular portion 232 of the roller 230 may be inserted within a track of a movable barrier system (e.g., the track 140 described with reference to FIGS. 1-3). In some assemblies, a roller 230 may be inserted within a left track and an additional roller 230 may be inserted within a corresponding right track.

At an additional step of assembly, the universal roller bracket 328 may be affixed to the section 192 of the movable barrier 190 by sliding the protrusions 321 and 322 of the upper bracket section 346 into the corresponding grooves 211 and 212 of the movable barrier 190. Similarly, a left universal roller bracket may be positioned at a left side of the movable barrier 190 and a right universal roller bracket may be positioned at a right side of the movable barrier 190. In some implementations, the protrusions 321 and 322 (or any other protrusions described herein) may alternatively be inserted into corresponding grooves 211 and 212.

At an additional step of assembly, the movable barrier 190 may be positioned relative to the left and right tracks such that the rollers 230 in either track align with one of the roller tubes (e.g., the roller tubes 323-325) of the left and right universal roller brackets.

At an additional step of assembly, the left and right universal roller brackets may be slid outward toward an outer left and right edge of the movable barrier 190 such that the appropriate roller tube of the brackets is positioned around the stems of the rollers 230. In some implementations, at any time after the roller 230 engages the track (e.g., the track 140 of FIGS. 1-2), the roller bracket may slide toward the end of the section panel engaging the roller stem 234 as it slides into the appropriate roller tube. As previously described, which roller tube of the bracket receives the stem of the rollers 230 may depend on the height of the universal roller brackets and/or which section of the movable barrier (e.g., the sections 192*a*-*d* of the movable barrier 190 of FIG. 2) the brackets are affixed to.

After the roller tubes are inserted into both the left and right tracks as well as the universal roller brackets, one or more fasteners may be placed through the recesses of the lower bracket sections of the universal roller brackets securing the universal roller brackets in place and preventing movement of the rollers 230 out of the corresponding roller tubes.

FIG. 4 is a perspective view of a section 192 of the movable barrier 190, a universal roller bracket 428, and a roller 230, according to aspects of the present disclosure. The universal roller bracket 428 may be similar to the universal roller bracket 228 described with reference to FIG. 2 and/or the universal roller bracket 328 described with reference to FIG. 3. For example, the universal roller bracket 428 may include an upper bracket section 446. The upper bracket section 446 may include two protrusions: a protrusion 421 and a protrusion 422. The protrusions 421 and 422 may be positioned within the corresponding grooves 211 and

212 of the movable barrier 190. In this way, the universal roller bracket 428, with the protrusions 421 and 422 within the grooves 211 and 212 may be permitted to move in the horizontal direction 390 along the panel of the movable barrier 190 but may be constrained from moving in any other direction.

Like the universal roller bracket 328, the universal roller bracket 428 may include three roller tubes including a roller tube 423, a roller tube 424, and a roller tube 425. Similar to the roller tubes 223-226 described with reference to FIG. 2 and/or the roller tubes 323-325 with reference to FIG. 3, each of the roller tubes 423-425 may be sized and shaped to receive a roller 230.

The universal roller bracket 428 may additionally include a lower bracket section 444. The lower bracket section 444 may include two openings 440 and 442. In some implementations, the recesses 440 and 442 (not pictured) may receive fasteners used to secure the lower bracket section 444 to the section 192 of the movable barrier 190. In some implementations, the openings 440 and 442 may align with corresponding orifices within the section 192 of the movable barrier 190 also sized and shaped to receive fasteners. A method of assembly of the universal roller bracket 428 may be similar to a method of assembly of the universal roller bracket 328.

The roller tubes 423-425 of the universal roller bracket 428 may be spaced from an inner surface of the movable barrier 192 by an upper arm 445 and a lower arm 447. As shown in FIG. 4, the roller tubes 423-425 may be spaced from the movable barrier 190 by an offset length that is greater than the offset length of the roller tubes 323-325 described with reference to FIG. 3. As a result, a gap between the roller tubes 423-425 and the movable barrier 190 may be larger than a gap formed between the roller tubes 323-325 and the movable barrier 190.

In some implementations, the arm 445 and the roller tubes 423-425 may be positioned along a line extending from the movable barrier 190 similar to the line 295 described with reference to FIG. 2. For example, the arm 445 and roller tubes 423-435 may be spaced from an inner surface of the movable barrier 190 at the angle 297 and may be positioned along a straight line or a curved line of curvature 296 (FIG. 2).

Because the universal roller bracket 428 spaces the roller tubes 423-425 away from the inner surface of the movable barrier 190 by a greater distance than the other universal roller brackets described previously, the universal roller bracket 428 may be used for securing taller movable barriers with additional sections to the movable barriers described previously.

In one example, a movable barrier may include six sections similar to the sections 192*a-d* described with reference to FIG. 2. The lower roller bracket 221 may secure a lower region of the lowest section (e.g., the section 192*a*) to a corresponding track (e.g., a track similar to the track 140). The universal roller bracket 328 may be used to secure the lowest three sections of the movable barrier, with rollers 230 inserted into the three different roller tubes 323-325 of the universal roller bracket 328 according to the position of the respective barrier section. Three additional sections may be secured to the corresponding track by the universal roller bracket 428 using the roller tubes 423-425 according to the position of the respective barrier section. In this way, the angle 297 (FIG. 2) between the movable barrier and the track may be maintained even for taller movable barriers.

Persons of ordinary skill in the art will appreciate that the implementations encompassed by the present disclosure are not limited to the particular exemplary implementations described above. In that regard, although illustrative implementations have been shown and described, a wide range of modification, change, combination, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. A universal roller bracket for a movable barrier, the universal roller bracket comprising:

a first bracket section comprising a protrusion configured to be coupled to the movable barrier, wherein the protrusion is configured to permit the universal roller bracket to slide in a lateral direction along the movable barrier and is configured to prevent the universal roller bracket from moving in a transverse direction away from the movable barrier;

a first arm extending from the first bracket section; and a plurality of roller tubes supported by the first arm and spaced from the first bracket section by the first arm, each roller tube of the plurality of roller tubes configured to receive a roller stem, each roller tube being spaced a different distance from the first bracket section.

2. The universal roller bracket of claim 1, further comprising a second bracket section spaced from the first bracket section, the second bracket section configured to be fixedly coupled to the movable barrier with a fastener.

3. The universal roller bracket of claim 1, wherein the different distances correspond to a non-linear relationship between each roller tube and the first bracket section.

4. The universal roller bracket of claim 1, further comprising a second arm, the first arm and the second arm forming a gap between the plurality of roller tubes and the movable barrier.

5. The universal roller bracket of claim 1, wherein the first bracket section comprises a second protrusion configured to slidably couple the first bracket section to the movable barrier.

6. The universal roller bracket of claim 5, wherein the protrusion is disposed on the first bracket section at a location vertically above or below the second protrusion.

7. The universal roller bracket of claim 1, wherein the different distances correspond to a linear relationship between each roller tube and the first bracket section.

8. The universal roller bracket of claim 1, wherein the protrusion is dovetail-shaped.

9. The universal roller bracket of claim 1, wherein the plurality of roller tubes includes an uppermost roller tube and a lowermost roller tube.

10. A movable barrier system, comprising:

a first section of a movable barrier comprising an inner surface and an outer surface, the inner surface comprising a retaining groove;

a first universal roller bracket comprising:

a first bracket section comprising a protrusion configured to be positioned within the retaining groove of the first section, wherein the protrusion is configured to permit the first universal roller bracket to slide in a lateral direction along the movable barrier and is configured to prevent the first universal roller bracket from moving in a transverse direction away from the movable barrier; and a first plurality of roller tubes spaced from the inner surface, wherein each roller tube is positioned a different distance from the inner surface; and a roller comprising a roller stem, wherein the roller stem is configured to be positioned within one of the first plurality of roller tubes.

11. The movable barrier system of claim 10, further comprising a track angled relative to a vertical axis of the first section.

12. The movable barrier system of claim 11, wherein the movable barrier is configured to be substantially vertical when in a closed position when the roller stem is positioned within the one of the first plurality of roller tubes.

13. The movable barrier system of claim 10, wherein the first universal roller bracket includes a second bracket section configured to be fixedly coupled to the first section.

14. The movable barrier system of claim 10, further comprising:

a second section of the movable barrier comprising an inner surface and an outer surface; and a second universal roller bracket including a second plurality of roller tubes, the second universal roller bracket configured to be coupled to the second section, wherein each roller tube of the second plurality of roller tubes is positioned a different distance from the inner surface of the second section, and wherein the distance of each roller tube of the second plurality of roller tubes from the inner surface of the second section is different than the distance of each roller tube of the first plurality of roller tubes of the first universal roller bracket from the inner surface of the first section.

15. The movable barrier system of claim 14, wherein the second section is positioned above the first section and the second universal roller bracket is positioned above the first universal roller bracket when the movable barrier is in a closed position.

16. The movable barrier system of claim 10, wherein the first bracket section comprises a second protrusion configured to slidably couple the first bracket section to the movable barrier.

17. The movable barrier system of claim 16, wherein the protrusion is disposed on the first bracket section at a location vertically above or below the second protrusion.

18. The movable barrier system of claim 10, wherein the different distances correspond to a linear relationship between each roller tube and the first bracket section.

19. The movable barrier system of claim 10, wherein the protrusion is dovetail-shaped.

20. The movable barrier system of claim 10, wherein the first plurality of roller tubes includes an uppermost roller tube and a lowermost roller tube.

* * * * *